United States Patent

[11] 3,621,118

[72] Inventors: Steve Bunish; Floyd A. Wilson; Theodore E. Hansen, all of Marion, Ind.
[21] Appl. No. 60,054
[22] Filed July 31, 1970
[45] Patented Nov. 16, 1971
[73] Assignee Anaconda Wire and Cable Company

[54] POWER CABLE FOR PORTABLE MACHINES
2 Claims, 1 Drawing Fig.
[52] U.S. Cl. .................................. 174/115, 174/117 R, 174/121 SR
[51] Int. Cl. .................................. H01b 7/00
[50] Field of Search .................................. 174/113 R, 114 R, 115, 116, 117 R, 121 R, 127 SR

[56] References Cited
UNITED STATES PATENTS
3,448,204 6/1969 Perrone .................. 174/115

Primary Examiner—E. A. Goldberg
Attorney—Victor F. Volk

ABSTRACT: A flat three-phase power able comprises a heavy grounding strand and a smaller ground-check strand with the structural balance of the cable and reliability of the ground-check strand assured by insulating the ground-check strand with a heavy sheath.

PATENTED NOV 16 1971
3,621,118
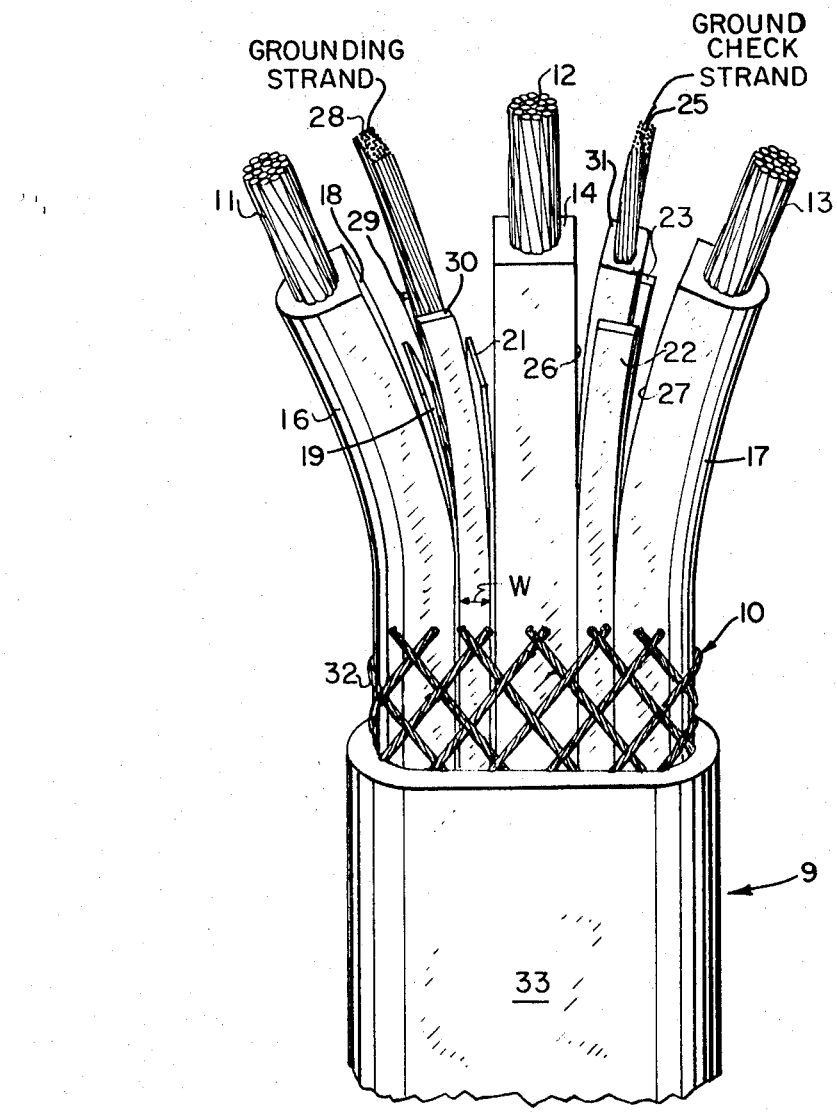
INVENTORS
STEVE BUNISH
FLOYD A. WILSON
THEODORE E. HANSEN
BY  V.F. Volk
THEIR AGENT

POWER CABLE FOR PORTABLE MACHINES

BACKGROUND OF THE INVENTION

In the operation of rubber-tired, electric-powered portable machines, such as mining machines, it is essential for considerations of safety that the machines, should be grounded. For this reason, when the machines operate on three-phase power, the current is taken from a Y source and grounding strands from the neutral terminal of the source are incorporated in the cable. For reasons of cost and space economy these grounding strands are uninsulated.

Cables for portable machines are being continuously wound and unwound as the machines are moved relative to the power source so that, in addition to the exacting requirements of toughness and durability required of such cables, there is a need for extreme flexibility so that the cables can be repeatedly wound and unwound without failure. It is necessary, also, to have the cables in structural balance so that they do not develop a tendency to warp or twist.

It has been customary to employ flat cables for mining machines with the cable conductors aligned in parallel. A widely used example of such a cable is shown as prior art in FIG. 1 of U.S. Pat. No. 3,448,204 where two uninsulated grounding conductors in a flattened configuration are positioned between the insulated phase conductors.

Recently, however, it has been portable desirable to incorporate another conducting element into a portable machine power circuit. This takes the form of a ground-check strand, connected in series with the grounding member so that the power can be automatically shut off if a break should occur in the latter and hazardous condition develop at the machine. A low voltage, such as 12 volts, and only low current are required for the ground-check circuit so that a small gage conductor is satisfactory for this service.

SUMMARY

We have invented a three-phase flat cable with a ground-check strand that retains the structurally balanced spacing of the phase conductors, comprising a core assembly comprising three equal-gage-size power conductors, each comprising a plurality of stranded copper wires, said conductors being in parallel alignment, a heavy-walled rectangular encasement of polychloroprene insulation surrounding the central of the conductors and heavy-walled D-shaped encasements of polychloroprene insulation surrounding each of the other two conductors. Our cable also comprises two breaker strips substantially equal in width to the flat surfaces of the D-shaped encasements. These strips are directly juxtaposed to one of the flat surfaces and the rectangular central conductor encasement. A flexible, flattened copper grounding strand, with a copper area at least 50 percent of the area of one of the power conductors, is positioned directly between the two breaker strips, separating them by a preselected distance. Our cable also comprises a flexible, stranded copper ground-check strand with a copper area no greater than two-thirds the area of the grounding strand and an encasement of polymeric insulation such, preferably, as polypropylene surrounding the ground-check strand which, with its encasement, is positioned directly between the central conductor and the other D-shaped encasement, separating them by a distance about equal to the distance between the two strips, thus equalizing the distance between the conductors and ensuring a flex endurance for the ground-check conductor exceeding the flex endurance of the grounding and conductor strands. The entire core is surrounded by an open fibrous binding with a tough polychloroprene jacket overall.

BRIEF DESCRIPTION OF THE DRAWINGS

The FIGURE shows a pictorial view of a cable made to our invention.

DETAILED DESCRIPTION OF A PREFERRED EMBODIMENT

For the purpose of explaining our conception in detail we shall describe a three-conductor cable employing No. 4 A.W.G. (American Wire Gage) copper conductors, although our invention will, of course, be applicable to other sizes. This cable, indicated generally in the drawing by the numeral 9, comprises a core 10 which is made up of three stranded copper phase conductors 11, 12, 13 with the central conductor 12 about equally spaced from the other two. The central conductor is insulated with a red polychloroprene (neoprene) encasement 14 in the form of an equal-sided rectangle or square with a minimum wall thickness of four sixty-fourths inches. The conductor 11 is insulated with a black neoprene encasement 16 and the conductor 13 with a white neoprene encasement 17 both D-shaped and with a four sixty-fourths wall thickness at the thinnest section. In direct juxtaposition with a flat surface 18 of the encasement 16 our cable comprises a breaker strip 19 which has the same width as the surface 18 and is formed of nylon fabric. A substantially identical breaker strip 21 is juxtaposed to a surface 24 of the encasement 14. These breaker strips provide sliding surfaces for the elements of the cable when it is flexed laterally and provide tough barriers against short circuiting of the conductors. Between the breaker strips 19 and 21 we have positioned a copper grounding strand 28 which has an A.W.G. No. 5. The grounding strand 28 should preferably not be more than 1 A.W.G. size smaller than the A.W.G. of the conductors 11, 12, and 13 and under no circumstances less than half the area of one of the power conductors in order to provide adequate grounding capacity. The illustrated grounding strand is made up of fine wires that have been rolled to a flat or rectangular shape after stranding so that the final width "W" is about 0.15 inch and the breadth about 0.31 inch. Rubber fillers 29, 30 keep the strand 28 centered in the core 10. An 8 A.W.G. ground-check strand 25 is comprised of six strands, each with 43 copper wires of size 32 A.W.G. The ground-check strand is flattened to 0.105×0.220 inches and encased with an extruded encasement 31 of yellow polypropylene insulation having a wall thickness of 45 mils. Rubber fillers 22, 23 serve to center the ground-check strand 25 in its encasement 31. Breaker strips such as the strips 19, 21 have long been used in mining machine cables to permit the elements of the cable to slide freely against each other when the cable is flexed and reduce abrasion and heating of the cable elements. It is a feature of the present invention that, by employing polypropylene for the encasement 31, two of these breaker strips can be eliminated since the surface hardness and stiffness and low frictional coefficient of this material against neoprene prevent the abrasion which would otherwise occur. A nylon Seine twine open web reinforcement binding 32 surrounds the core 10 and is, in turn, surrounded by a tough extruded, lead-cured, neoprene jacket 33, 170 mils thick.

An essential feature of our invention resides in the manner in which the ground-check strand 28 has been incorporated so as to maintain the symmetry of the cable and to outlast the other conductors in flex life. Symmetry is important to a mining machine cable because, if the tensile moments contributed by the power conductors are unbalanced, the cable will twist, perhaps permanently, and this will create additional stresses and increase the abrasion of repeated reeling and unreeling. The durability of the ground-check strand is essential because, while cable performance may depend upon the other conductors, reliance is made on the ground-check strand for safe operation of the mining machines. In prior art cables symmetry was achieved by dividing the grounding conductor into two strands which were then positioned at either side of the central conductor. With the addition of a ground-check strand this symmetry, and the structural balance of the cable, would be destroyed except for our discovery that the required copper area for grounding could be included in one flattened strand and that, even though it has a much lesser area than the grounding strand, the ground-check strand can be built up by a rectangular polymeric extrusion to a width that will bring the cable into substantial structural balance. The ground-check strand 25, since it has a potential of only about 12 volts, necessary to close a relay, does not require a heavy wall of insulation for electrical purposes and, indeed, a 5 mil wall would suffice, electrically. We have found, however, that by increasing the insulation thickness to at least 30 mils but preferably to three sixty-fourths inch, about 47 mils, not only is greater structural balance provided for the cable, but the flexing life of the ground-check strand is so far improved that it will outlast all the other conductors. To test the performance of the ground-check strands in flexure, lengths of cable made to the above description were repeatedly flexed back and forth over small diameter mandrels until all the wire strands in the power conductor strands 11, 12, 13 had broken. This took place at 30,000 cycles of flexing. At this point it was found that only about 9 percent of the wires in the grounding strand 28 remained unbroken but about 31 percent of the wires in the heavily insulated ground-check strand remained intact. We believe that the extra stiffness provided by the use of polypropylene for the encasement 31 contributed substantially to the improved flex life.

We have invented a new and useful mining machine cable of which the foregoing description has been exemplary rather than definitive and for which we desire an award of Letters Patent as defined in the following claims.

We claim:

1. A flat, flexible, three-phase power cable suitable for use on portable mining machines comprising:

A. a core assembly comprising:

a. three equal-gage-size insulated power conductors in parallel alignment, the central of said insulated conductors comprising a plurality of stranded copper wires and rectangular encasement of polychloroprene insulation surrounding said wires, and each of the other of said conductors comprising a plurality of stranded wires and a D-shaped encasement of polychloroprene insulation surrounding said wires, said D-shaped encasement having substantially flat surfaces facing said central conductor, b. A flexible flattened copper grounding strand comprising a copper area at least 50 percent of the area of the wires in one of said conductors, said grounding strand being positioned between the central insulated conductors and a first of said conductors comprising said D-shaped encasement, c. a flexible copper ground-check strand comprising a copper area no greater than two-thirds the area of said grounding strand, said ground-check strand being positioned between said central conductor and the second of said conductors comprising said D-shaped encasement, and d. a rectangular encasement of polymeric insulation surrounding said ground-check strand, said encasement having sufficient thickness and stiffness whereby the flex endurance of said ground-check strand exceeds the flex endurance of said grounding strand and said conductor wires, B. an open web fibrous binding surrounding said core, and C. a tough polychloroprene jacket surrounding said binding overall.

2. The cable of claim 1 wherein said polymeric insulation is polychloroprene.

* * * * *